United States Patent [19]
Eubank

[11] 3,944,242
[45] Mar. 16, 1976

[54] PRE-STRESSED, PRE-FABRICATED CONCRETE SUPPORTING STRUCTURE FOR A MOBILE HOME

[76] Inventor: Marcus P. Eubank, P.O. Box 7576, Longview, Tex. 75601

[22] Filed: Nov. 8, 1974

[21] Appl. No.: 521,962

[52] U.S. Cl. .................. 280/30; 29/452; 52/143; 280/29
[51] Int. Cl.² ... B60R 27/00; E04B 5/04; E04H 1/02
[58] Field of Search .................. 52/143, 294, 299; 296/31 R; 280/29, 30; 29/452

[56] References Cited
UNITED STATES PATENTS

| | | | |
|---|---|---|---|
| 2,322,841 | 6/1943 | Foster | 280/106 T |
| 2,590,685 | 3/1952 | Coff | 52/294 |
| 3,109,440 | 11/1963 | Schjeldahl et al. | 52/2 |
| 3,806,147 | 4/1974 | Hanson | 280/30 |
| 3,811,722 | 5/1974 | Jones | 296/31 R X |

*Primary Examiner*—Philip Goodman
*Assistant Examiner*—Milton L. Smith
*Attorney, Agent, or Firm*—James C. Fails

[57] ABSTRACT

A new supporting structure for a mobile home comprising pre-stressed concrete and a method for making same. The supporting structure comprises a rectangular floor, supported by beams on the lower surface of the floor. A pair of large longitudinal beams are formed on the lower surface of the floor adjacent the longitudinal edge of the floor. A plurality of smaller transverse beams are formed on the lower surface of the floor connecting the longitudinal beams. Both the longitudinal and transverse beams are pre-stressed. Means for attaching wheels and a towing hitch are provided. The supporting structure is cast in a single piece in a bed provided with channels for the longitudinal and transverse beams. The beams are pre-stressed in a conventional manner either by pre-tensioning or post-tensioning tendons. After the concrete has set and the tendons anchored, the supporting structure is lifted out, and wheels and a towing hitch attached. Walls and the upper structure are later attached by means of studs cast in the concrete floor.

13 Claims, 11 Drawing Figures

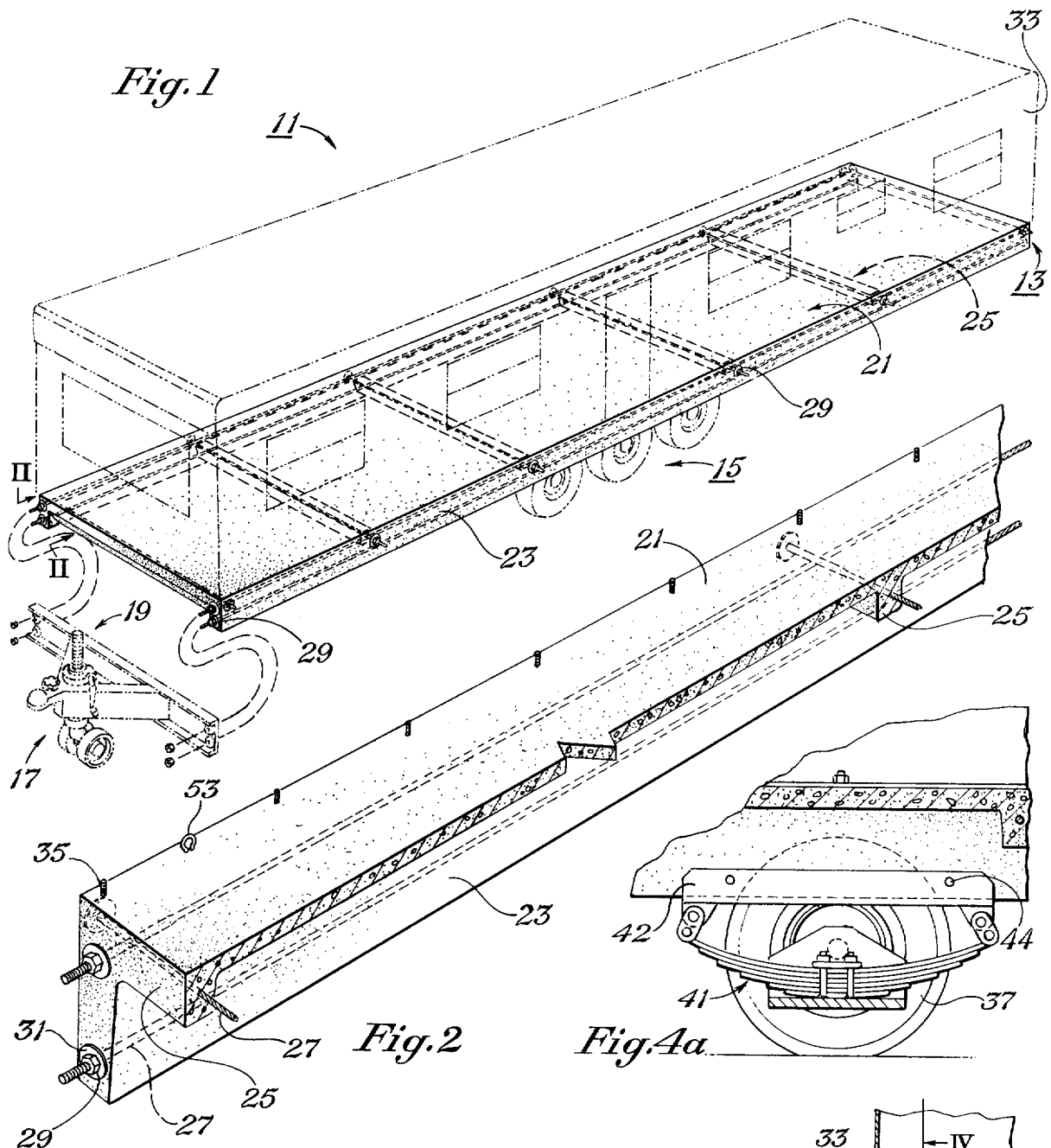

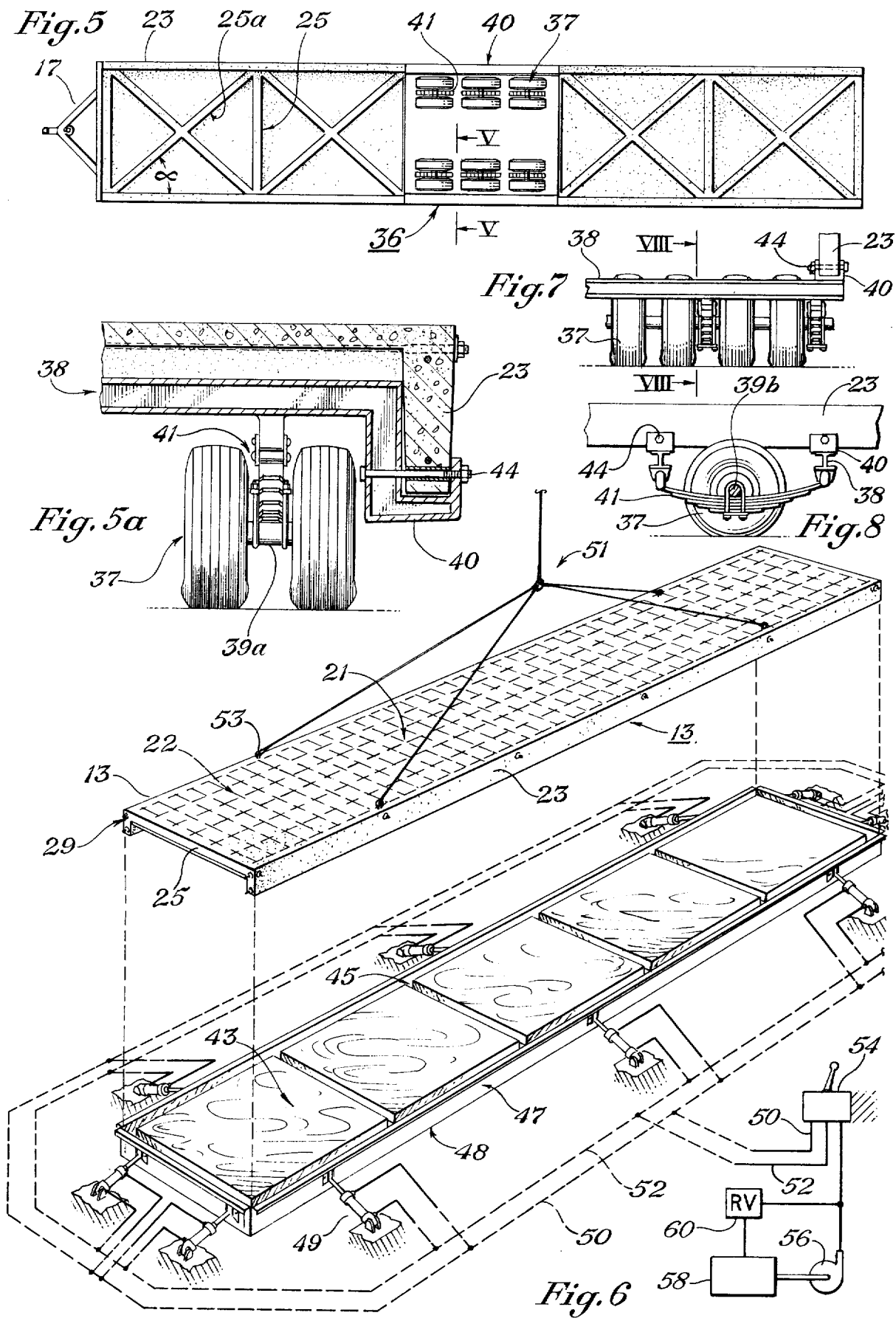

3,944,242

PRE-STRESSED, PRE-FABRICATED CONCRETE SUPPORTING STRUCTURE FOR A MOBILE HOME

BACKGROUND OF THE INVENTION

1. Field of the Invention:

This invention relates in general to mobile homes and in particular to a new supporting structure comprising pre-stressed concrete and a method of making same.

2. Description of the Prior Art:

The supporting structure for a conventional mobile home comprises two longitudinal steel beams running the length of the mobile home. Lighter transverse steel beams, often webbed, provide lateral support. The floor is generally of wood or of a suitable composite material. Normally a sub-floor encloses wiring, pipes, ducts, or provides a heating and cooling duct itself.

While the steel beam supporting structure is succesful, there are several disadvantages. Material and labor costs are high. To save material costs, the beams and floor are relatively light-weight. While the light weight is an advantage during towing, it is a disadvantage when the mobile home is stationary and being used as a home. Increasingly mobile homes are purchased for economical considerations, not because of their mobility. Often they remain several years on one site, therefore it is desirable for them to have the same characteristics of stability and wearability as a conventional stationary house.

One disadvantage of the steel beam supporting structure is derived from the high center of gravity, which requires anchoring by guy-wires to prevent being blown over by strong winds. Also the wheels are normally removed or lifted from the ground, requiring cement blocks to place under the beams. The beams normally do not come into contact with the ground, even though the trailer would be more stable, because access under the mobile home is desirable or necessary.

The general object of this invention is to provide a supporting structure, including floor and bracing, for a mobile home that is economical in costs and construction. Another object is to provide a supporting structure for a mobile home that is sufficiently rigid and heavy such that anchoring is not required while stationary, yet still light enough to be pulled on its own wheels. Another object is to provide a supporting structure, including floor and bracing for a mobile home, that comprises pre-stressed concrete. Another object is to provide an economical and efficient method of constructing a concrete supporting structure for a mobile home.

BRIEF DESCRIPTION OF THE DRAWING

FIG. 1 is an isometric view of a typical mobile home in phantom, but with a pre-stressed concrete supporting structure constructed in accordance with the principles of this invention.

FIG. 2 is an enlarged fragmentary isometric view of the supporting structure of FIG. 1, showing a portion of a side and front, with the towing hitch removed.

FIG. 3 is an enlarged fragmentary elevational view of a front corner of the supporting structure of FIG. 1, with the towing hitch attached.

FIG. 3a is a partial cross-sectional view of FIG. 3 along the line III—III with towing hitch attached.

FIG. 4 is an enlarged partial sectional view of FIG. 1 taken along line II—II showing one configuration of wheel assembly and wall attachment.

FIG. 4a is a partial cross-sectional view of FIG. 4 along the line IV—IV.

FIG. 5 is an elevational view of the bottom of another embodiment of a concrete supporting structure and a second wheel assembly configuration.

FIG. 5a is a partial cross-sectional view of FIG. 5 along the line V—V.

FIG. 6 is a partial isometric view showing a method of constructing a concrete supporting structure.

FIG. 7 is a partial sectional view of a third wheel assembly configuration.

FIG. 8 is a partial cross-sectional view of FIG. 7.

DESCRIPTION OF THE PREFERRED EMBODIMENT

Referring initially to FIG. 1, a mobile home 11 of conventional design, except for the supporting structure 13 is shown in phantom. The mobile home 11 is normally transported by being towed on a supporting wheel assembly 15, which is often removed when it reaches its permanent site. A towing hitch 17 provides means to secure the mobile home 11 to a truck. A movable wheel assembly 19 maintains the mobile home 11 in a horizontal position while detached from a truck.

As FIG. 2 shows, the supporting structure 13 in the preferred embodiment, formed of pre-stressed concrete, comprises floor 21 braced by longitudinal beams 23 and transverse beams 25. The longitudinal beams 23 are in the proximity of the edge of the floor 21 and may be flush as FIG. 2 shows. The longitudinal beams 23 have more cross-sectional height than transverse beams 25, and the floor 21 is thinner than both. The longitudinal beams 23 may be in the range of 15 to 20 inches in height while the transverse beams 25 are only 4 to 6 inches in height measuring from the top of the floor 21 to the bottom of the beams 23, 25. The floor 21 itself may be only 2 to 4 inches in thickness, and normally is reinforced with conventional reinforcing wire mesh 22, FIG. 6.

While the mobile home is stationary at its permanent site, relatively light loads will be imposed on it by the upper structure, occupants, and furnishings. However during construction handling and towing to a new site, there will be various forces imposed by the weight of the supporting structure 13 itself. To prevent the supporting structure 13 from breaking or cracking in tension, the longitudinal beams 23 and transverse beams 25 are pre-stressed in known manner in order to increase their strength.

As shown protruding in the fragmentary view of FIG. 2, tendons 27, fastened in tension, compress the beams 23, 25. The beams 23, 25 may be pre-stressed by pre-tension, that is by placing the tendons 27 in tension before pouring the concrete. Or they may be pre-stressed by post-tension by tightening the tendons 27 against the beams 23, 25 after the concrete has been poured and set. The number of tendons 27 required per beam 23, 25, positioning, and amount of tension will vary depending on weight and size of the supporting structure 13. Conventional anchors 29, as shown schematically in FIG. 3a fasten the tendons 27 in tension against bearing plates 31, as by screwing to bolts 30 swaged or welded to tendons 27.

The towing hitch 17 may be bolted directly onto the anchor assembly 29. If desired, the anchors 29 affecting the initial tensioning may be recessed as shown in FIG. 3a in order to give the towing hitch 17 greater strength and stability. Recess 32 of towing hitch 17 fits over anchor 29 and contains a hole through which bolt 30 inserts. Nut 34 tightens the towing hitch 17 to bolt 30. Alternately the anchor 29 might be placed in a recess cast in the concrete.

The walls 33 may be installed as shown schematically in FIG. 4 by bolting to studs 35 cast in the concrete floor 21. The concrete supporting structure 13 may be towed by the use of various types of wheel assemblies 15, which are not a part of this invention. The supporting structure 13 is fairly heavy, thus wheel assemblies 15 stronger than with a conventional mobile home are necessary. One shown schematically in FIG. 4, comprises a plurality of wheels 37 in pairs connected by a short axle 39, which may be in a U-shape to lower the mobile home. The axles are attached to the longitudinal beams 23 by means of springs 41, which are attached to a flanged plate 42, shown more clearly in FIG. 4a. The flanged plate 42 is attached by bolts 44 inserted through holes formed in beam 23. Alternately, studs might be cast on the inner side of beam 23 rather than using bolts 44, although not the bottom of beam 23 since the supporting structure 13 sits directly on the ground.

The method of construction, shown schematically in FIG. 6, involves initially preparing a bed 43 with channels 45 of depth and size to form the beams 23, 25. The bed 43 is enclosed by a frame 47 of dimensions of the supporting structure 13. The frame 47 is pivotally fastened to the surface via hinge 48. Hydraulic means, such as hydraulic rams 49, break the frame 47 from any bonding with the outside edges of the structure 13, such as side and end beams 23, 25.

The hydraulic rams 49 are operated by high pressure hydraulic fluid supplied by lines 50 and 52 responsive to operation of a master switch 54. The high pressure hydraulic fluid is supplied by a conventional source, such as pump 56 taking suction from reservoir 58. Excess fluid is returned to the reservoir 58 via relief valve 60 when the pump is operating. The hydraulic fluid provides a liquid block that obviates the necessity for independent latches. Nevertheless, latches, such as bolts through aligned eyes, can be employed to ensure that the ends and sides of the frame 47 remain engaged for a correct supporting structure 13.

Templates for water and drainage pipes, and heating and air conditioning ducts (not shown) may be placed in position or they may be cast in place. Reinforcing wire mesh 22 for the floor 11, studs 35, and templates for bolts 44 for attaching walls and wheel assemblies 15 are placed in position.

Tendons 27 of high strength steel cable are suspended in position. Should pre-tensioning be desired, the tendons 27 are placed in tension by hydraulic jacks or winches (not shown).

To prevent bonding between the concrete and mold, all surfaces to remain unbonded are covered with a hydrophobic bond breaker. This may be done by spraying a solution of oil containing paraffin wax or other hydrophobic materials thereon. Moreover, spreading any material which will prevent bonding, such as polyethylene plastic, is suitable.

Should post-tensioning be desired, the tendons 27 are initially suspended loosely and covered with a hydrophobic bond breaker to prevent bonding. The tendons 27 in the post-tensioning process must not bond with the cement, as they do in pre-tensioning.

In the preferred method a concrete slurry is then poured into the mold formed by the frame 47 and bed 43. After setting sufficiently, the frame 47 is drawn away, and tendons 27 under pre-tension anchored in a conventional manner. If post-tension is utilized, the tendons 27 are tensioned after setting, in a conventional manner such as by tightening anchor 29 on bolt 30 affixed to the end of tendons 27 (FIGS. 3, 3a), or other suitable means. A thorough discussion of prestressing by both methods as well as anchoring may be found in the *Standard Handbook for Civil Engineers* edited by Frederick S. Merritt (McGraw-Hill Book Company, 1968) in Section 8, all of which material is incorporated by reference.

After the beams 23, 25, are anchored in a prestressed condition, the supporting structure 13 is removed from the bed 43 by means of cables 51 attached to eyes 53 cast in the concrete, and lifted by a crane or other lifting device (not shown). Another method of lifting the supporting structure 13 may be by use of hydraulic jacks (not shown) embedded in the surface of the bed 43. Wheel assembly 15 and towing hitch 17 are then affixed. The supporting structure 13 may be towed if desired to another location for installing the walls 33 and fixtures. After completion the mobile home may be towed to the permanent site and wheel assembly 15 and towing hitch 17 removed. For maximum stability, the longitudinal beams 23 sit directly on the surface, making anchoring unnecessary.

A fairly heavy, high-strength concrete such as one with weight greater than 80 pounds per cubic foot is desirable for the pre-stressed beams 23, 25, though unnecessary for the floor 21. Normally the concrete slurry is monolithic, having a uniform weight and strength throughout the supporting structure 13. Should an over-all lighter weight be desired, a bilithic concrete slurry may be used by adding more lightweight aggregates, such as pumice or furnace cinders in with the portions to be poured which form the floor 21. Heavier concrete could remain in the channels which form the pre-stressed beams 23, 25. Various suitable light-weight aggregates are discussed in the reference *The Chemistry of Cement and Concrete* by F. M. Lea (Chemical Publishing Company, Inc., 3rd Edition, 1971) on pages 578–590, all of which material is incorporated by reference. Moreover the floor 21 could if desired remain free of cement, and a wood or other suitable material affixed to the supporting frame created by the longitudinal and transverse beams 23, 25.

Another embodiment is shown in FIG. 5. Transverse beams 25a are placed diagonally and pre-stressed to resist twisting forces that may be present while towing over an uneven surface. The angle $\alpha$ between the axes of the longitudinal beams 23 and transverse beams 25a depends on the number of transverse beams and width of the supporting structure 13, but is less than 90°. Normally some or all of the transverse beams 25 perpendicular to longitudinal beams 23 are retained. Also diagonal transverse beams 25a intersect each other forming an "X" configuration in FIG. 5, though other variations are apparent without an intersection, such as a "V" configuration.

An alternate form of wheel assembly is shown in FIGS. 5, 5a. This wheel assembly, which may also be used with the preferred embodiment of FIG. 1, avoids placing one wheel 37 outside of longitudinal beam 23 as in FIGS. 4, 4a. The wheels 37a are interconnected in a dolly 36 by means of springs 41 attached to axles 39a. Flange 40 supports longitudinal beam 23. The top of dolly 36 may support transverse beams 25 also if desired. A plurality of I-beams 38 add strength to the dolly 36. The dolly 36 may be bolted to the supporting structure 13 such that it may be positioned at various points along the supporting structure and easily removed once the mobile home is at its permanent site.

FIGS. 7, 8 demonstrate a third embodiment for wheel assembly 15. A gang of wheels 37 extends across the width of the supporting structure 13, supported on a single axle 39b. The axle 39b is attached to two I-beams 38 by means of leaf springs 41, which are underslung to lower the height. The I-beams are fastened by means of bolts 44 inserted through holes cast in beam 23. This embodiment allows fewer rows of axles than the three rows of FIG. 5, which reduces transverse drag force on wheels 37 during sharp turns.

It should be apparent from the foregoing description that an invention having significant advantages has been provided. The concrete supporting structure provides a relatively heavy, stable base with a low center of gravity. Because the longitudinal beams 23 may sit directly on the surface, blocking up and anchoring is unnecessary, yet access underneath is still present. Insulation and resistance to deterioration is improved, and skirting between the surface and the walls 33 will be unnecessary on the longitudinal sides. The method of construction requires a minimum of labor and is economical in material costs.

The foregoing disclosure and showings made in the drawings are merely illustrative of the principles of this invention and are not to be interpreted in a limiting sense.

I claim:

1. A supporting structure for a mobile home comprising:
    a rectangular floor,
    means for attaching walls to the periphery of the upper surface of said floor,
    first concrete beams extending longitudinally on the lower surface of said floor and adjacent the longitudinal edges of said floor, said first beams being of uniform cross-sectional height throughout their length,
    second concrete beams extending transversely on the lower surface of said floor, each of which forms a connection between said first beams,
    said first and second beams being pre-stressed by a plurality of tendons extending longitudinally through each of said first and second beams,
    means for mounting wheels on the lower surface of said structure,
    means for attaching a towing hitch to the front of said structure.

2. The supporting structure defined by claim 1 wherein a selected number of said second beams extend on the lower surface of said floor and intersect each of said first beams at an angle $\alpha$ less than 90°.

3. The supporting structure defined by claim 1 wherein a selected number of said second beams extend on the lower surface of said floor, intersecting each other diagonally, and intersect each of said first beams at an angle $\alpha$ less than 90°.

4. The invention defined by claim 1 wherein said second beams extend on the lower surface of said floor perpendicularly to said first beams, each of which forms a connection between said first beams.

5. The invention defined by claim 1 wherein said first beams comprise a single pair and extend longitudinally on the lower surface of said floor and form the extreme longitudinal edges of said floor.

6. The invention defined by claim 5 wherein a wheel assembly is attached to the first concrete beams.

7. The invention defined by claim 6 wherein the wheel assembly comprises:
    a flange detachably mounted below and carrying the first concrete beams;
    at least two pairs of wheels mounted in a substantially common axis and carrying the flange.

8. The invention defined by claim 1 wherein said floor and said first and second beams comprise a monolithic mixture of equal and uniform weight concrete.

9. The invention defined by claim 1 wherein said first and second beams comprise high strength pre-stressed concrete and said floor comprises a light-weight concrete.

10. The invention defined by claim 1 wherein said floor is composed of concrete containing reinforcing means.

11. The invention defined by claim 10 wherein said second beams extend on the lower surface of said floor, intersect each other diagonally, and intersect each of said first beams at an angle $\alpha$ less than 90°.

12. The invention as defined by claim 10 wherein the first and second beams and the floor are cast in a solid integral piece.

13. The invention as defined by claim 1 wherein the first and second beams comprise heavy high strength concrete.

* * * * *